United States Patent
Ladouceur

(10) Patent No.: US 7,179,034 B2
(45) Date of Patent: Feb. 20, 2007

(54) TORQUE RESISTANT FASTENING ELEMENT

(75) Inventor: Harold A. Ladouceur, Livonia, MI (US)

(73) Assignee: Whitesell International Corporation, Muscle Shoals, AL (US)

(*) Notice: Subject to any disclaimer, the term of this patent is extended or adjusted under 35 U.S.C. 154(b) by 403 days.

(21) Appl. No.: 10/271,480

(22) Filed: Oct. 16, 2002

(65) Prior Publication Data

US 2004/0076489 A1    Apr. 22, 2004

(51) Int. Cl.
F16B 37/04 (2006.01)

(52) U.S. Cl. .................. 411/181; 411/501; 411/179; 411/107; 29/432.1; 29/432.2

(58) Field of Classification Search ............... 411/501, 411/181, 179, 107, 187, 188, 161–163; 29/524.1, 29/512, 432, 432.2, 432.1
See application file for complete search history.

(56) References Cited

U.S. PATENT DOCUMENTS

| | | | |
|---|---|---|---|
| 1,112,525 A * | 10/1914 | Darling | 248/187.1 |
| 2,707,322 A | 5/1955 | Strain et al. | |
| 3,204,679 A * | 9/1965 | Walsh | 411/180 |
| 4,018,257 A * | 4/1977 | Jack | 411/181 |
| 4,430,034 A * | 2/1984 | Fujikawa | 411/179 |
| 4,555,838 A | 12/1985 | Müller | |
| 4,810,143 A * | 3/1989 | Muller | 411/181 |
| 5,020,950 A | 6/1991 | Ladouceur | |
| 5,056,207 A | 10/1991 | Ladouceur | |
| 5,092,724 A | 3/1992 | Muller | |
| 5,140,735 A | 8/1992 | Ladouceur | |
| 5,528,812 A * | 6/1996 | Muller | 29/432.2 |
| 5,564,873 A * | 10/1996 | Ladouceur et al. | 411/180 |
| 5,644,830 A * | 7/1997 | Ladouceur et al. | 29/432.2 |
| 5,868,535 A * | 2/1999 | Ladouceur | 411/181 |
| 6,122,816 A | 9/2000 | Ladouceur | |
| 7,047,617 B2 * | 5/2006 | Ladouceur | 29/432.1 |

* cited by examiner

*Primary Examiner*—William L. Miller
(74) *Attorney, Agent, or Firm*—Howard & Howard Attorneys, P.C.

(57) ABSTRACT

A fastening element capable of being attached to a panel by deforming the panel is disclosed. A barrel portion is tubular with an open free end and has an axis defining a circumference. A radial flange portion is integral with the tubular barrel portion opposite the free end and defines a circumferential surface. The radial flange portion includes a plurality of projections spaced apart and extending outwardly from the circumferential surface. Each of the projections defines at least one wall generally perpendicular to the circumference about the axis of the barrel portion.

32 Claims, 5 Drawing Sheets

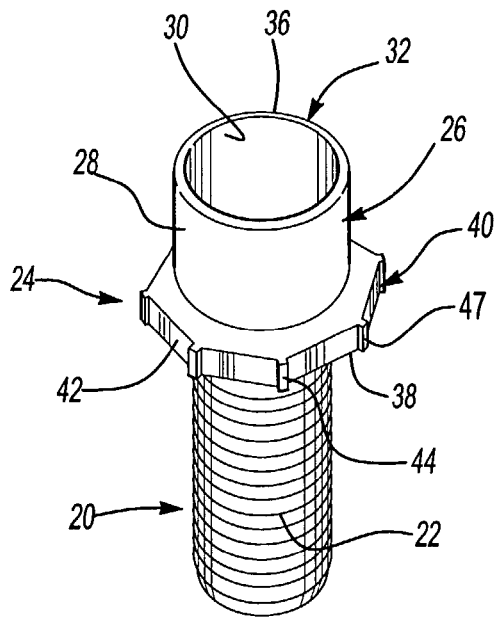
Fig-1
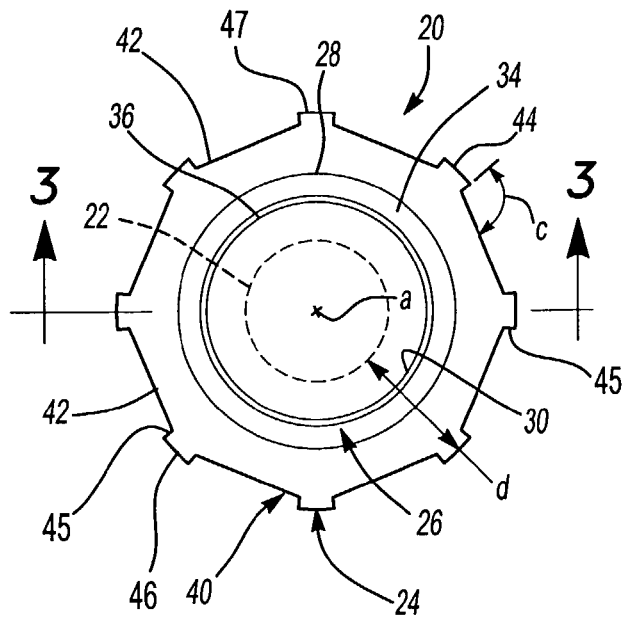
Fig-2
Fig-3
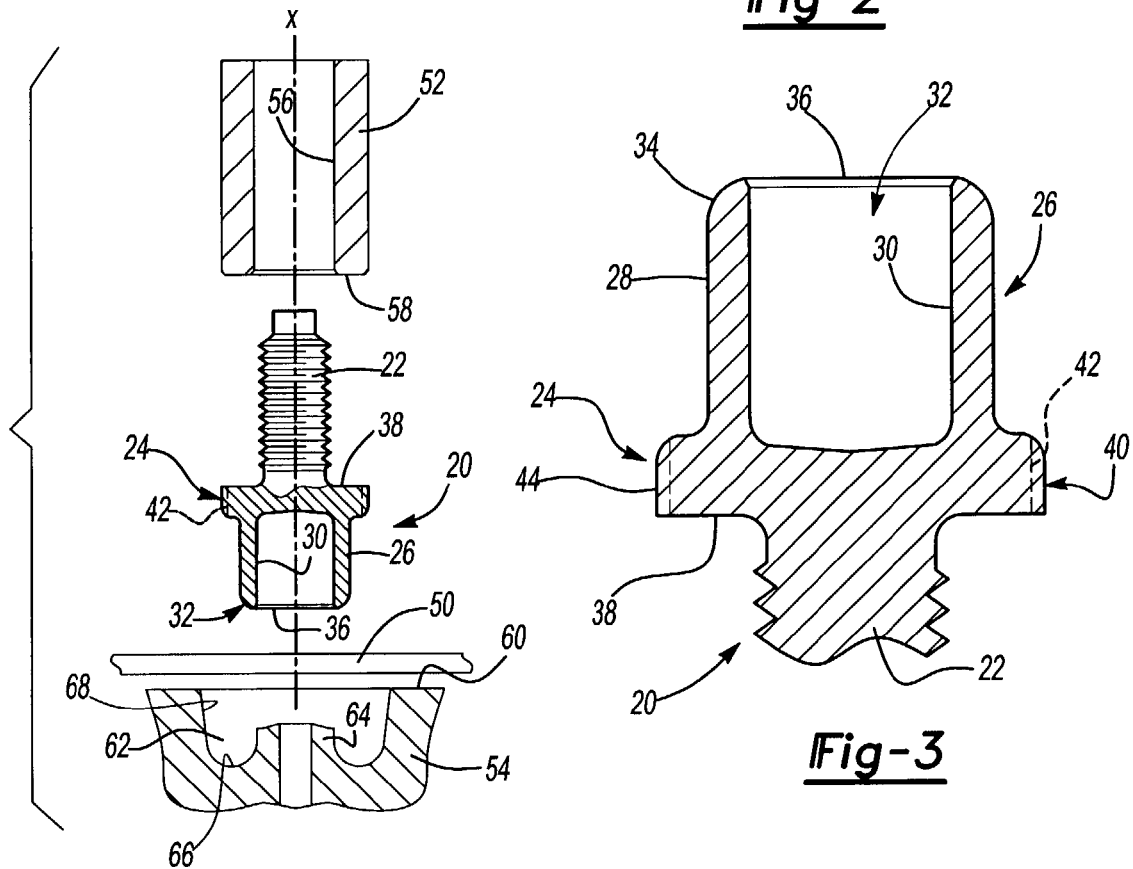
Fig-4

TORQUE RESISTANT FASTENING ELEMENT

FIELD OF THE INVENTION

This invention relates to a fastening element having a tubular barrel portion that is capable of being mechanically fixed to a panel. More specifically, this invention relates to a fastening element with a tubular barrel portion having anti-rotation projections to improve the torque characteristics of the fastening element.

BACKGROUND OF THE INVENTION

Self-piercing and clinching female fasteners, such as nuts, were developed by the predecessor in interest of the Applicant (Multifastener Corporation) about 50 years ago as disclosed, for example, in U.S. Pat. No. 2,707,322. Self-piercing and clinching nuts are attached to a metal panel in a die press, which may also be used to simultaneously form the panel, wherein generally an upper die platen includes an installation head and a lower die platen includes a die member or die button. In the case of a self-piercing nut, a projecting pilot portion pierces an opening in the panel and the panel metal adjacent the pierced panel opening is then clinched to the fastener with each stroke of the die press. In the case of a clinch nut, an aperture is pre-existing in the panel so that the projecting pilot portion is received in the aperture and the panel opening is then clinched to the fastener with each stroke of the die press.

More recently, self-piercing and clinching male and female fasteners were developed having tubular barrel portions as disclosed, for example, in U.S. Pat. No. 4,555,838 assigned to the Assignee of this Application. The self-piercing and clinching fasteners disclosed in this patent include a barrel portion that is tubular, and a radial flange portion that is integral with the barrel portion. These self-attaching male fasteners are installed in a die press, as described above, wherein the lower die platen includes a die button having a panel supporting surface, a central die post, and an annular die cavity surrounding the die post. The annular die cavity includes a semi-circular annular bottom surface, a radial lip portion at the upper extent of the semi-circular bottom surface, and a generally frustoconical surface extending from the radial lip portion to the end surface of the die button. It is very important in most applications of the self-piercing and clinching male fasteners that the fastener be able to withstand significant torque loads without twisting in the panel, which may destroy the fastener and panel assembly. One such method of increasing the torque characteristics of the male fastener has been drawing and slightly deforming the radial flange of the projection fastener into the panel with the upper die surface. However, this has proven to provide inadequate torque characteristics for many applications, including automotive applications.

Various attempts have been made to improve the torque resistance of self-piercing and riveting projection fasteners of the type disclosed in U.S. Pat. No. 4,555,838. Initially, anti-rotation protrusions or nubs were provided either on the barrel portion, or on the radial flange portion adjacent the barrel portion. As disclosed, for example, in U.S. Pat. No. 4,810,143, also assigned to the assignee of the present Application. Presently, self-attaching fastening elements of the type disclosed herein include a plurality of spaced pockets in the outer edge of the flange portion adjacent the barrel portion as disclosed in U.S. Pat. No. 5,020,950, also assigned to the assignee of the present Application. There remains, however, several problems associated with the use of pockets in the flange as disclosed in U.S. Pat. No. 5,020,950. First, the die surfaces which form the pockets wear, such that the pockets are not always fully formed in the flange portion resulting in insufficient torque resistance. Second, the self-piercing projection fastener and panel assembly is press sensitive. That is, if the panel metal is not fully deformed into the pockets, the torque resistance will be inadequate. Further, the pockets form stress risers in the panel which can become a source of failure of the fastener and panel assembly. Finally, the use of pockets in the flange portion may provide insufficient torque resistance, particularly where extreme torque resistance is required.

Attempts have been made to reduce the impact of the problems associated with the anti-rotation concepts detailed above. One such example is disclosed in pending U.S. patent application Ser. No. 10/004,918. This application discloses a radial flange portion having a radial surface defining spaced concave surfaces separated by an outer cylindrical surface. During installation of the fastening element to the panel, the barrel portion is deformed outwardly and upwardly defining a U-shaped channel that receives the panel. The radial flange deforms the panel downwardly into the U-shaped channel, thereby securing the fastening element to the panel. The outer cylindrical surfaces further deform the panel providing an interaction between the radial flange portion and the panel that produces anti-rotational qualities that increase the torque capabilities of the fastening element.

The arcuate design of the radial flange portion disclosed in the U.S. patent application referenced above has proven to increase the torque characteristics of the fastening elements. While the arcuate configuration is beneficial to deforming the panel due to the smooth transition of its arcuate shape, it is believed that the torque characteristics of the fastening element may be improved further by optimizing the design of the radial surface. Therefore, it would be desirable to provide a radial surface having a configuration capable of increasing the torque characteristics of the fastening element being mechanically attached to the panel.

SUMMARY

A fastening element that is capable of being attached to a panel by deforming the panel is disclosed. The fastening element includes a barrel portion that is tubular and has an open free end. The barrel portion includes an axis that defines a circumference about the barrel. A radial flange portion is integral with the tubular barrel portion opposite the free end of the barrel portion. The radial flange defines a circumferential surface. The circumferential surface includes a plurality of projections spaced apart and extending radially outwardly from the circumferential surface. Each of the projections define at least one wall generally perpendicular to the circumference about the axis of the barrel portion.

The open free end of the barrel portion is deformed outwardly and upwardly into a generally U-shaped portion that receives a first panel portion. A second panel portion is deformed downwardly by the radial flange portion of the fastening element into a space between each of the plurality of projections extending radially outwardly from the circumferential surface into the second panel portion permanently deforming the panel and preventing the fastening element from rotating about the axis relative to the panel portion.

Unlike prior art anti-rotation features, each projection includes a wall that is substantially perpendicular to a circumferential rotation about the axis x defined by the barrel portion. The permanent deformation of the panel by the plurality of projections provides an interlocking interaction between each wall that is generally perpendicular to the circumference about the axis of the barrel portion and the panel. Therefore, the fastening element is prevented from rotating relative to the panel. In fact, torque resistance testing of the fastening element having a shank portion has shown that the failure mode is the shank portion of the fastening element, and not the interlocking interface between the fastening element and the panel.

In some instances, the newton meters of force have been increased to nearly twice the required torque for a given fastener size. For a fastener having an 8 mm projection, the Newton meters of force have been increased from a requirement of 14 nm to 26–28 nm. For a 10 mm projection, the torque resistance has increased from the required 34 nm to 50–52 nm. On a 12 mm projection, the torque resistance has increased from a required 70 nm to approximately 84 nm. It is known to those of skill in the art that until testing was conducted on the inventive fastening element disclosed in this application, that the torque resistance of prior art fastening elements have had some difficulty in meeting the torque resistance requirements. Additionally, it is believed that prior art fastening elements have never exceeded the torque requirements. Therefore, the torque resistance results achieved by the inventive fastening element recited in this Application were unexpected.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an end perspective view of a preferred embodiment of the fastening element of this invention;

FIG. 2 is an end view of the fastening element of this invention;

FIG. 3 is a partial side cross-sectional view of the fastening element illustrated in FIGS. 1 and 2;

FIG. 4 is an exploded side view partially cross-sectioned of the fastener illustrated in FIGS. 1 to 3 aligned for installation to a panel with a die member and a driving member;

DETAILED DESCRIPTION OF THE INVENTION

Figure 5:
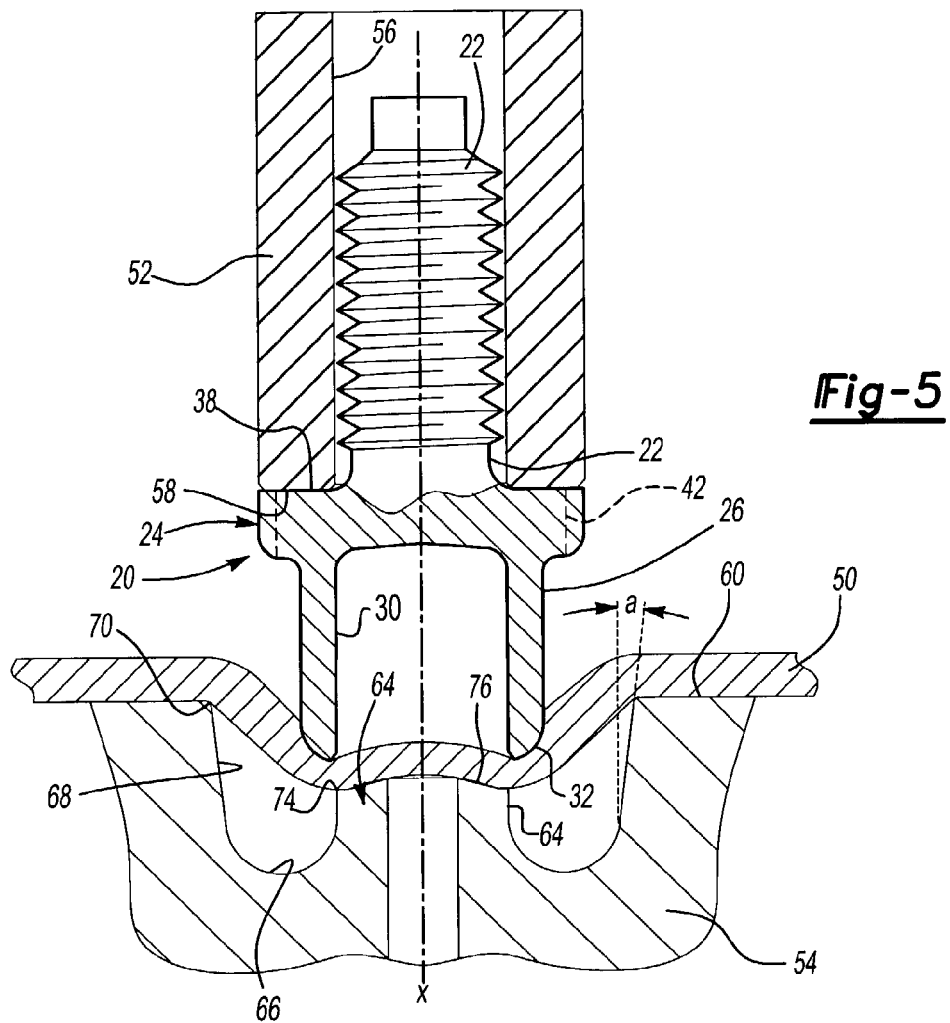
FIG. 5 is a side cross-sectional view during the initial installation of the fastener illustrated in FIGS. 1 to 4 in a preferred embodiment of the die member and driving member.

As set forth above, this invention relates to an improved fastening element having significantly improved torque resistance, and a method of attaching the fastening element to a panel. As will be understood by those of skill in the art, the drawings illustrate preferred embodiments of this invention but are not limiting except as set forth in the appended claims. Although the figures demonstrate the self-piercing projection, the invention is not limited to a self-piercing projection and can include other fastening elements capable of being mechanically affixed to a panel such as, for example, self-piercing nuts, clinch nuts, clinch projections, and equivalents.

FIGS. 1 through 3 illustrate one embodiment of the fastening element generally shown at 20 in the form of a male fastener having a threaded shank portion 22. It should be understood by those of skill in the art that the projection or shank portion 22 may be threaded or unthreaded and may take various forms. As stated above, the embodiment shown in the figures is "self-piercing" referring to the ability of the fastening element to pierce its own hole in the panel during the fastener installation as described below. The self-piercing fastener 20 further includes a radial flange portion 24 integral with the shank portion 22 and a barrel portion 26 having a tubular configuration. The barrel portion 26 is integral with the radial flange portion 24 and is coaxially aligned with the shank portion 22. The preferred embodiment of the barrel portion 26 includes a cylindrical external surface 28 and a cylindrical internal surface 30 as best represented in FIG. 3. The barrel portion 26 includes an open free end 32 having an arcuate annual outer bearing surface 34 and a chamfered internal piercing surface 36 that interact providing the ability of the open free piercing end 32 to be pierceable. The open free end 32 is positioned distally on the barrel portion 26 from the radial flange 24. As described more fully in the above-referenced U.S. Pat. No. 4,555,838, the chamfered piercing surface 36 centers the fastener on the panel during installation and pierces an opening in the panel having a diameter less than the external diameter of the cylindrical external surface 28. It should be understood by those of skill in the art that a non-piercing fastener would not require an internal piercing surface 36.

The radial flange portion 24 includes an annular planar bearing surface 38 surrounding the shank portion 22 and a circumferential surface 40 circumscribing the planar bearing surface 38. The circumferential surface 40 includes a plurality of generally planar surfaces 42 having a projection 44 extending radially outward therebetween. As best represented in FIG. 2, each projection 44 includes at least one wall 45 that is generally perpendicular to a circumference of rotation about the axis x defined by the barrel portion 26. It should be understood that by being generally perpendicular to the circumference of rotation that the wall 45 is actually generally perpendicular to a force that is tangential to the circumference of rotation. As will be explained further below, the at least one wall 45 provides improved torque resistance characteristics to the fastening element 20 not provided by prior art fastening elements. Each projection 44 includes a distal surface 47 having an arcuate or convex configuration. However, it may be desirable to provide a projection 44 having a planar distal surface 46.

The fastening element 20 of this invention is particularly adapted for mass production applications, such as used by the automotive industry to install self-piercing and clinching fasteners and sheet metal parts, including brackets, body panels, and the like. Such sheet metal parts are typically formed in a die press. The fastening element 20 of this invention may be installed in the sheet metal panel or a plate with each stroke of the die press, wherein an upper platen of the die press typically includes an installation head having a reciprocating plunger 52 and a lower die platen includes a female die member or die button 54 as shown in FIG. 4. These are more fully described in the above-referenced U.S. Pat. No. 4,555,838.

The reciprocating plunger 52 includes a cylindrical bore 56, which receives the shank or projection portion 22 of the fastening element 20. A driving end portion 58 of the plunger 52 is configured to be received against the planar annular bearing face 38 of the radial flange portion 24 as shown in FIG. 4, et seq. The female die button 54, best shown in FIG. 5, includes a planar end bearing surface 60, which supports the panel 50. The panel 50 may also be clamped to the bearing surface 60. The die button 54 includes an annular die cavity 62 defined in the bearing surface 60 surrounding a central die post 64. The annular die cavity 62 includes an annular semi-circular bottom surface or wall 66 and a frustoconical outer side wall 68 extending tangentially from the semi-circular bottom wall 66 to the bearing face 60. A radial edge 70 defines an inner section of the bearing face 60 adjacent to the frustoconical outer side wall 68. The frustoconical outer side wall 68 defines a smooth continuous surface extending tangentially from the annular semi-circular bottom 66 at an included angle shown in FIG. 5 of between 5 and 12 degrees. More preferably, the angle a is between generally 6 and 10 degrees. The radial edge 70 joining the frustoconical outer side wall 68 and the bearing surface 60 preferably has less than 0.04 inch radius. An end surface 76 of the central die post 64 may also include staking cavities (not shown) to retain a slug pierced from the panel 50 as disclosed in above-referenced U.S. Pat. No. 5,056,207. If the fastening element 20 is not of the self-piercing type, and an aperture (not shown) already exists in the panel 50, obviously, a need will not exist to retain a slug.

As shown schematically in FIG. 4, the fastening element 20, reciprocating plunger 52, and die button 54 are aligned by the installation apparatus or "head" (not shown) along the longitudinal axis x prior to installation. The fastening element 20, being of the self-piercing type, is received in the installation head generally located in the upper die platen and the shank portion 22 is initially received in the cylindrical bore 56 of the reciprocating plunger 52 prior to installation. As set forth above, the panel 50 may be clamped to the bearing surface 60 of the die button in the lower die platen (not shown).

FIG. 5 illustrates the initial step in the installation sequence of the self-piercing fastening element 20 and the panel 50. The driving end portion 58 of the reciprocating plunger 52 is driven against the annular planar bearing portion 38 of the radial flange portion 24, which drives the free open end 32 of the barrel portion 26 against the panel 50. This deforms the panel 50 against the end surface 76 of the die post 64 as shown in FIG. 5. The panel 50 is deformed into the die cavity 62 against the end surface 76 of the die post 64 around the radial edge 70 by the open free end 32 and the internal piercing surface 36.

Figure 6:
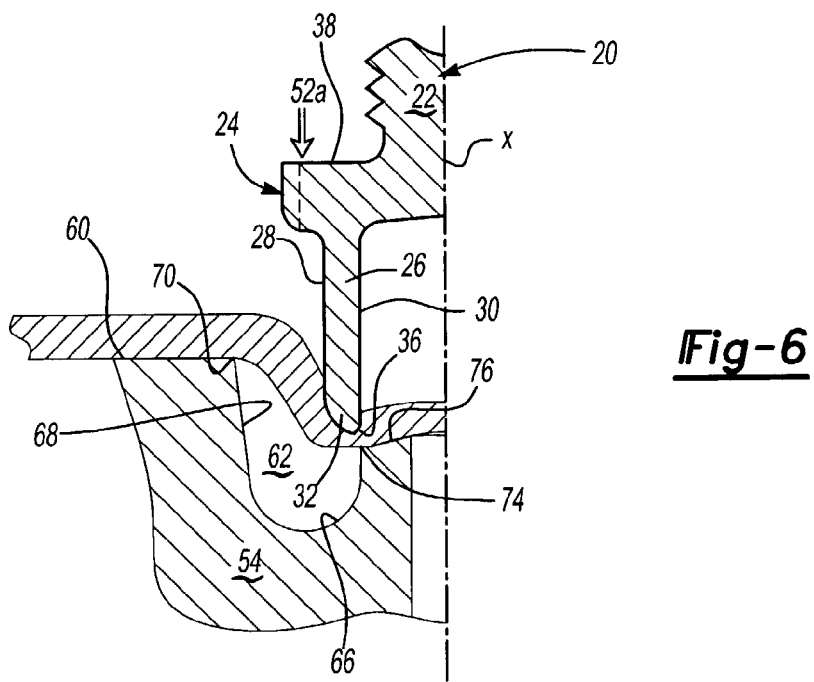
FIGS. 6 to 14 are side cross-sectional views of the fastener and die member of this invention illustrating the installation sequence and the method of installation of this invention.
Figure 7:
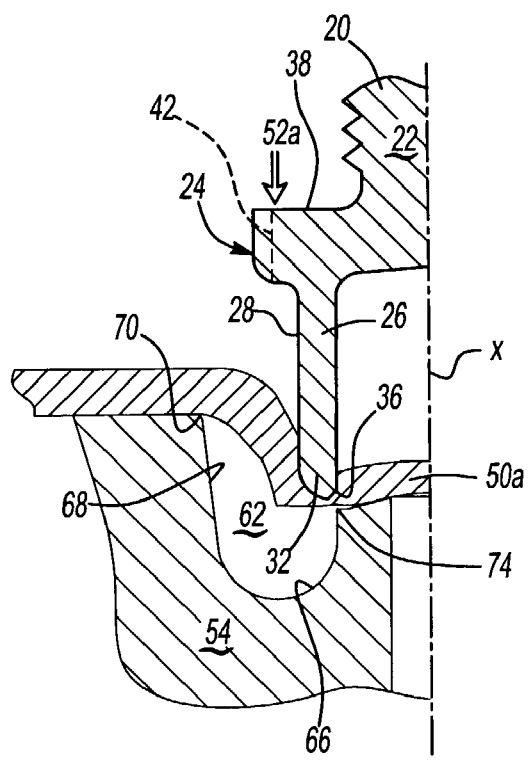
Figure 8:
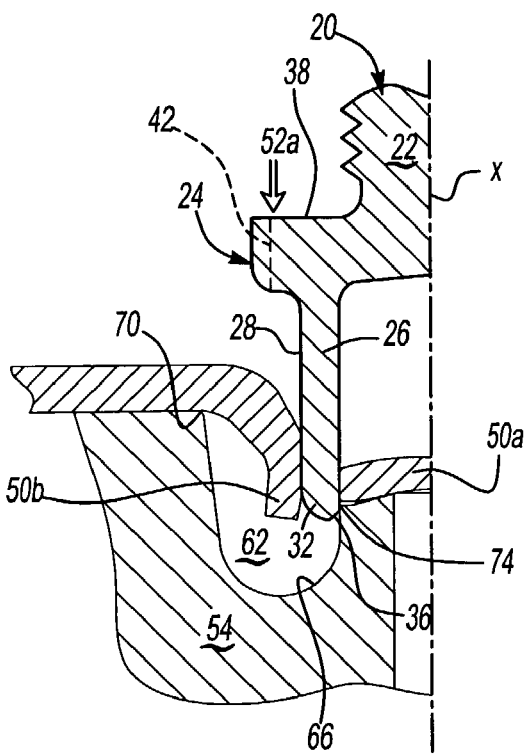
Figure 9:
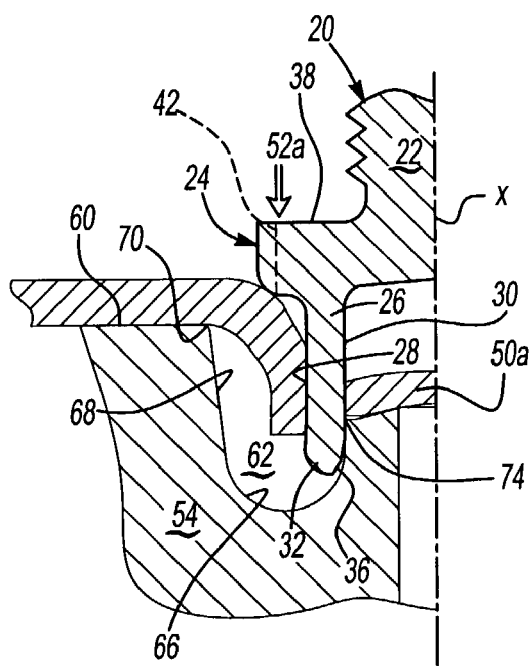
Figure 10:
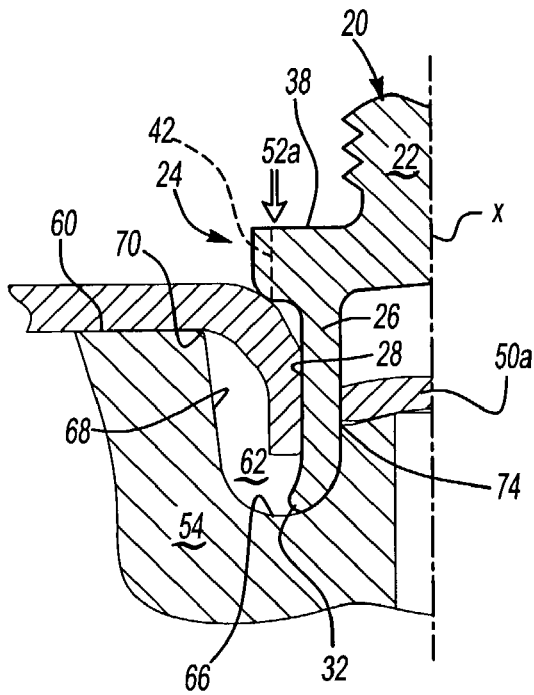
Figure 11:
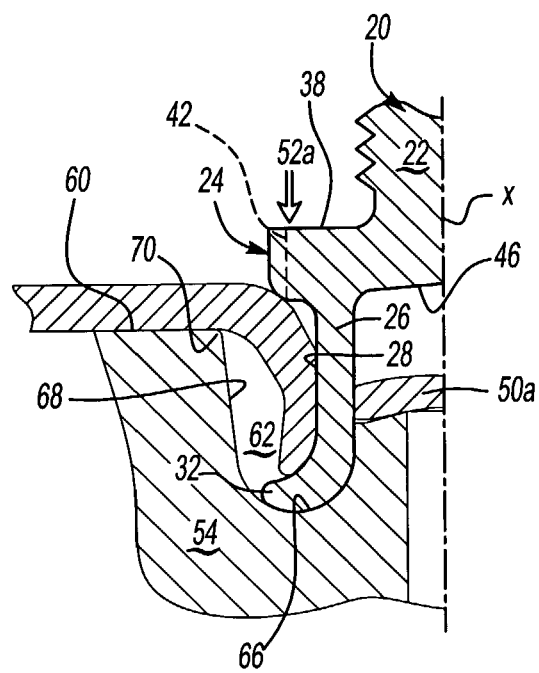
Figure 12:
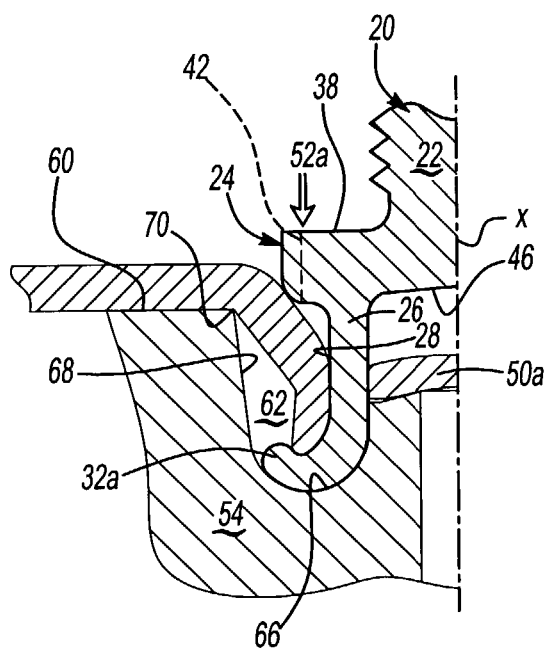

FIGS. 6 to 14 illustrate the sequence of installation of the fastening element 20 in the panel 50, wherein the reciprocating plunger 52 is replaced by an arrow 52a for clarity. As shown in FIG. 6, the internal piercing surface 36 cuts the panel against a circular outer sharp piercing edge 74 of the central die post 64 as shown in FIGS. 6 and 7 until a slug 50a is cut from the panel as shown in FIG. 8. An edge portion of the panel 50b adjacent the pierced slug 50a is then received against the cylindrical external surface 28 of the tubular barrel portion 26 as shown in FIGS. 8 and 9. Simultaneously, the external surface 28 of the tubular barrel 26 draws the panel portion 50b into the annular die cavity 62. The cylindrical internal surface 30 of the tubular barrel portion 26 is then received against the frustoconical outer side wall 68 of the die post 64 as shown in FIG. 9 and subsequently against the semi-circular bottom wall 66 as best shown in FIG. 10. Upon engagement of the open free end 32 of the tubular barrel portion 26 with the semi-circular bottom wall 66, the tubular barrels portion 26 is deformed into a U-shape as best shown in FIGS. 10 through 12.

Figure 13:
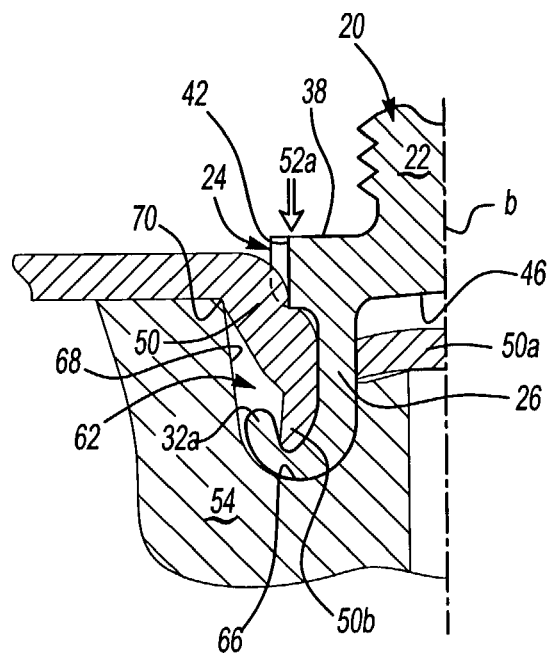
Figure 14:
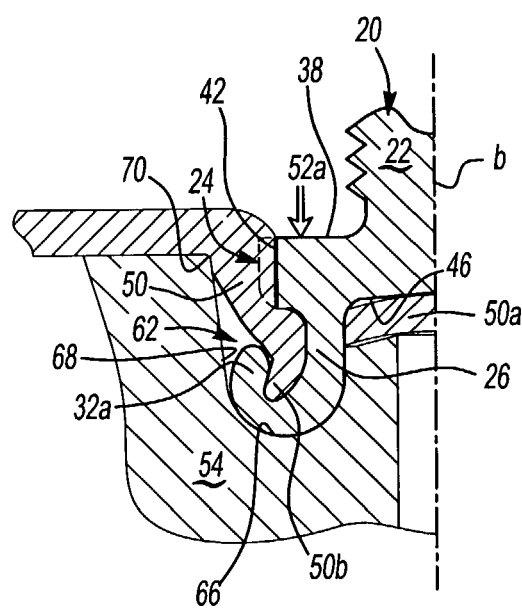

It should be noted that during the sequence of installation illustrated in FIGS. 10–12, the edge portion 50b of the panel 50 remains unsupported in the die cavity 62 and against the outer surface 28 of the barrel portion 26. Further, it is important to note that the radial flange portion 24 is not driven into the edge portion 50b. Therefore, the edge portion 50b remains spaced from the outer side wall 68 of the central die post 64. The edge portion 50b is eventually enclosed within a U-shaped end portion 32a of the now deformed barrel portion 26 as shown in FIGS. 12 and 13. Upon forming the free end 32 and the annular semi-circular bottom wall 66, the U-shaped free end 32 is spaced from the frustoconical side wall 68 as shown in FIG. 13.

Figure 15:
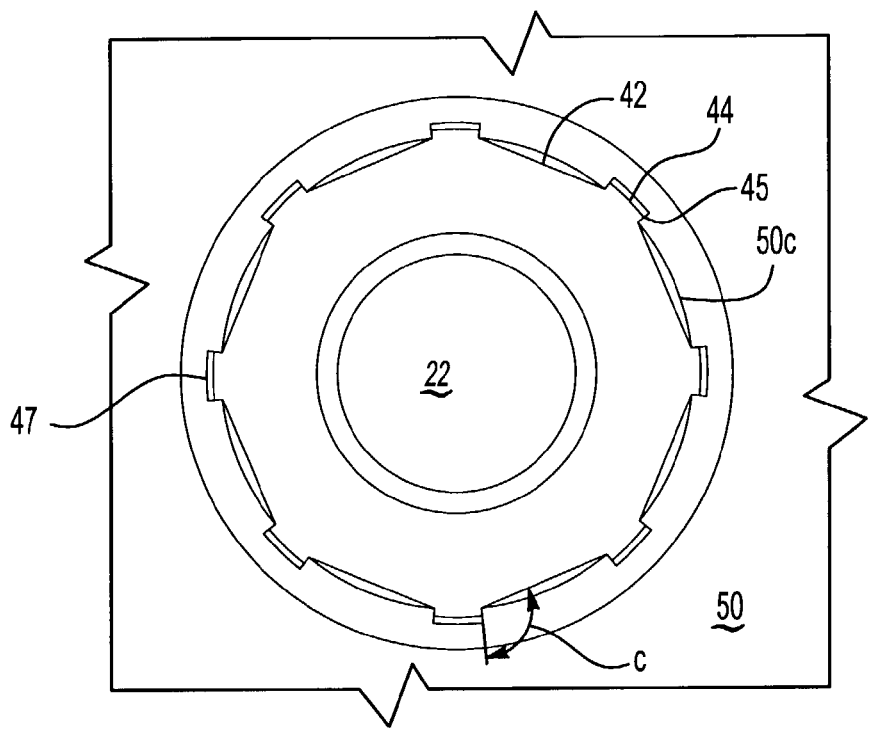
FIG. 15 is a top view of the fastening element of this invention secured to a panel.
Figure 16:
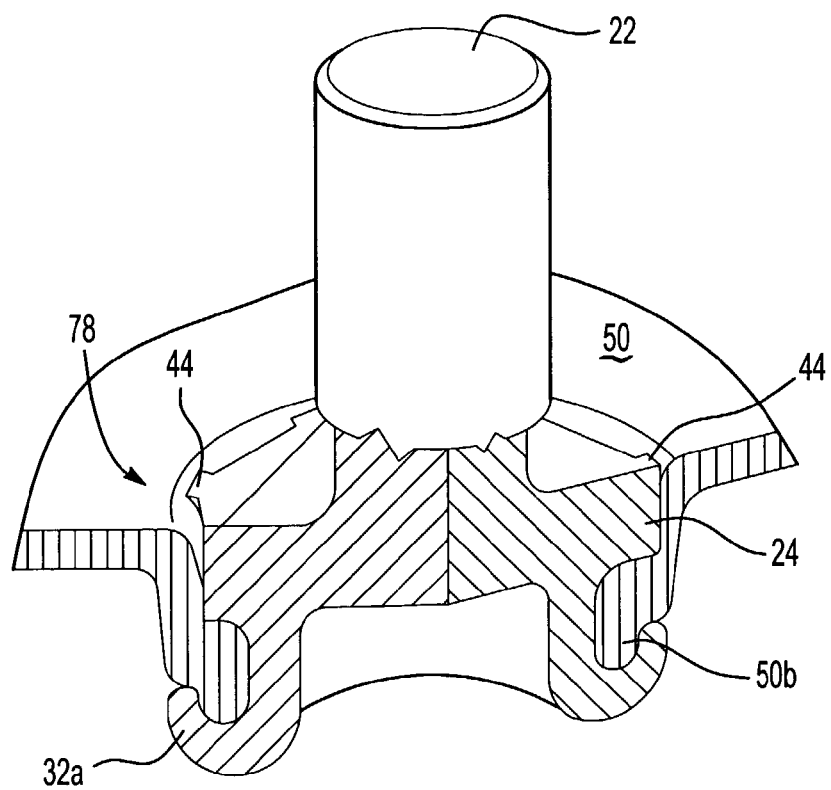
FIG. 16 is a partial perspective, sectional view of the fastening element of this invention secured to a panel.

As shown in the sequence drawings of FIGS. 15 and 16, a panel portion 50c now disposed in the die cavity 62 adjacent the radial edge 70 is incrementally squeezed between the outer side wall 68 adjacent the radial edge 70 and the radial flange portion 24. The panel portion 50c continues to be deformed by the radial edge 70 until the panel portion 50c partially fills the space between each of the projections 44 disposed upon the radial flange portion 24. Simultaneously, the projections 44 deform the panel portion 50c radially outwardly from the axis x defined by the barrel portion 26. The deformation is best represented in FIGS. 15 and 16. Referring again to FIG. 14, the radial flange portion 24 is preferably driven into the annual die cavity 62 such that the annular bearing portion 38 is spaced slightly below the plane of the panel 50. This is desirable because components being attached to the fastening element 20 preferably lie flush against the panel 50. It should be understood, that if the installation was designed to have the bearing portion 38 flush with the panel, normal tolerance build-up would result in some of the installations having the attaching component disposed above the panel 50.

As best shown in FIG. 16, the panel portion 50c is squeezed or deformed into the space defined between each of the projections 44. The panel portion 50c substantially, but not completely fills the space between the projection 44 as exemplified by arrow 78. The frustoconical outer side wall 68 adjacent the planar end bearing surface 60 thus serves as a wedge as the flange portion 24 is driven into the die cavity 62, incrementally deforming the panel portion 50c into the space between each projection 44. It should also be understood that the radius of the radial edge 70 can be optimized to control the amount of the panel portion 50c that fills the space between the projections 44. For example, a small radius of the radial edge 70 would deform a larger amount of the panel portion 50c into the space between the projections 44 than would a radial edge 70 having a large radius.

Referring again to FIG. 2, each projection 44 includes at least one wall 45 defined by a plane extending radially outwardly from the axis x defined by the barrel portion 26. Preferably, each projection includes two walls 45 defined by a plane extending radially outwardly from the axis x defined by the barrel portion 26. Because each wall 45 is defined by a plane extending radially outwardly from the axis x, each wall forms an angle c with each generally planar surface 42 that is obtuse. As stated above, each wall 45 is therefore aligned perpendicular to a circumference of rotation about the axis x defined by the barrel portion 26. Accordingly, each wall 44 provides an optimum resistive force against the rotation of the fastening element 20 relative to the panel 50.

Test results have indicated that generally eight projections 44 provide an adequate amount of resistance to torque for fastening elements 20 having a shank portion 22 of 6 mm or less. It is believed that fastening elements 20 having a shank portion 22 of greater than 6 mm may require more than eight projections 44. For example, 12 projections 44 may be required for a fastening element 20 having a 10 mm shank portion 22. While fastening elements 20 having an even number of projection 44 have been disclosed in this Application, it should be understood that additional benefits may be obtained by including an odd number of projections 44. In any event, the number of projections 44 can be tuned to meet various torque requirements for a given fastening element 20. As the torque requirements increase for a given fastening element 20, it is desirable to increase the number of projections 44 disposed upon the circumferential surface 40 of the radial flange portion 24.

Further testing has indicated that the failure mode of the fastening element 20 relative to the torque being introduced to the fastening element 20 has moved from the interaction between the fastening element 20 and the panel 50, wherein the fastening element 20 rotates relative to the panel 50, to the shank portion 22. In each test on 6 mm shanks, the shank portion has either broken free from the fastening element 20 or the threads disposed upon the shank portion 22 have stripped. These test results have unexpectedly indicated the increase in torque resistance of up to two times present industry standards. On 8 mm and larger posts, in 30 thousandths panels, the fastening element has rotated relative to the panel during torque resistance testing, but at levels around twice the required levels. For example, a fastening element 20 having a 6 mm post and a radial flange portion 24 with eight projections 44 has produced a successful torque resistance of up to 26 to 28 nm, which is significantly higher than industrial standards of 14 nm. Test results on a fastening element 20 having an 8 mm projection with a radial flange portion 24 having eight projections 44 have resulted in torque resistance of up to 42 to 44 nm, which is significantly greater than present industry standards of 34 nm. Additional testing has been conducted on fastening elements 20 having a 10 mm shank portion 22 and a radial flange portion 24 having twelve projections. These test results have produced a torque resistance of up to 84 nm, again significantly greater than industrial standards of 70 nm. In addition to the number of projections 44, it is believed that a still greater torque resistance may be generated by increasing the width of each of the projections 44. Therefore, as a torque requirement increases for a given fastening element, a relative increase in the width of each projection 44 would be desirable.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A fastening element and panel assembly comprising:
   a panel;
   a fastening element having a barrel portion being tubular with an open free end and defining an axis having a circumference thereabout;
   a radial flange portion integral with said barrel portion opposite said free end and defining a circumferential surface;
   a post portion integral with said radial flange portion extending rearwardly from said barrel portion generally along an axis of said barrel portion having a threaded surface; and
   said open free end of said barrel portion being deformed outwardly and upwardly into a hook shape and said panel being received by said deformed barrel portion thereby securing said fastening element to said panel, said circumferential surface of said radial flange portion permanently including projections spaced apart and extending outwardly from said radial flange portion deforming said panel, wherein each of said projections include at least one planar side surface extending generally perpendicular to said circumference about said axis defined by said barrel portion thereby preventing said fastening element from rotating about said axis relative to said panel.

2. A fastening element as set forth in claim 1, wherein said open free end of said barrel portion defines a piercing surface positioned distally from said radial flange portion.

3. A fastening element as set forth in claim 1, wherein said radial flange portion defines a generally planar surface between adjacent of said projections.

4. An assembly as set forth in claim 3, wherein each of said projections defines a generally polygonal shape having at least one surface defining an obtuse angle to said generally planar surface.

5. An assembly as set forth in claim 1, wherein each of said at least one surface is defined by a plane extending radially outwardly from said axis defined by said barrel portion.

6. An assembly as set forth in claim 1, wherein said radial flange portion includes a diameter greater than a diameter of said barrel portion.

7. A fastening element as set forth in claim 6, wherein each of said projections includes a generally arcuate surface defined by said diameter of said radial flange portion.

8. A method of attaching a fastening element in a panel, said fastening element having a barrel portion being tubular with an open free end and defining an axis, and having a radial flange portion integral with said panel portion opposite said free end defining a circumferential surface with a plurality of projections extending radially outwardly, each projection having at least one planar surface extending radially outwardly from said axis, including the steps of:
   supporting at least one side of said panel;
   driving said open free end of said barrel portion of said fastening element through said panel;
   deforming a first portion of said panel circumscribing said barrel portion of said fastening element downwardly against said tubular barrel portion;
   deforming said open free end of said barrel portion outwardly and upwardly around said first portion of said panel circumscribing said barrel portion thereby forming a generally U-shaped end portion of said barrel portion around said first portion of said panel;
   deforming a second panel portion downwardly with said radial flange portion of said fastening element and into a space between each of said plurality of projections wherein said projections extend radially from said axis into said second panel portion permanently deforming said panel thereby preventing said fastening element from rotating about said axis relative to said panel portion.

9. A method as set forth in claim 8 further including the step of piercing a hole in said panel with said barrel portion.

10. A method as set forth in claim 9 further including the step of deforming said first panel portion in said U-shaped end portion into an enlarged bead having a thickness generally greater than the thickness of said panel and having a height measured between said flange portion and said U-shaped end portion of said barrel portion greater than its width.

11. A self-attaching fastener, comprising:
   a tubular barrel portion having a first end and a second open free end;
   a radial flange portion integral with said barrel portion adjacent said first end having an outer circumference including a plurality of circumferentially spaced radial projections and planar surfaces between said spaced radial projections; and
   each of said spaced radial projections including a planar, generally radial side face extending generally perpendicular to said outer circumference of said radial flange portion.

12. The self-attaching fastener as defined in claim 11, wherein each of said radial projections includes a cylindrical convex outer end face and said radial projections are circumferentially aligned forming a discontinuous generally cylindrical outer surface of said radial flange portion.

13. The self-attaching fastener as defined in claim 11, wherein said radial projections are equally circumferential spaced on said outer circumference of said radial flange portion a circumferential width greater than a circumferential width of said radial projections.

14. The self-attaching fastener as defined in claim 13, wherein said circumferential width of said radial projections is greater than a radial length of said radial projections.

15. The self-attaching fastener as defined in claim 11, wherein each of said radial projections includes opposed planar generally planar radial side faces and convex end faces.

16. The self-attaching fastener as defined in claim 11, wherein said self-attaching fastener is a male fastener having a shank portion integral with said first end of said tubular barrel portion coaxially aligned with said tubular barrel portion.

17. A self-attaching fastener, comprising:
   a tubular barrel portion having a first end and a second open free end;
   a radial flange portion integral with said barrel portion adjacent said first end having an outer circumference including a plurality of circumferentially spaced radial projections having a circumferential width less than a circumferential width of said radial flange portion between said radial projections; and
   each of said radial projections including planar side faces on opposed sides of said projections extending generally radially and generally perpendicular to said outer circumference of said radial flange portion and convex end faces.

18. The self-attaching fastener as defined in claim 17, wherein each of said end faces of said radial projections are cylindrical and circumferentially aligned, forming a discontinuous cylindrical outer surface of said radial flange portion.

19. The self-attaching fastener as defined in claim 17, wherein said radial projections are equally circumferentially spaced on said outer circumference of said radial flange portion a circumferential width at least about twice said circumferential width of said radial projections.

20. The self-attaching fastener as defined in claim 19, wherein said circumferential width of said radial projections is greater than a radial length of said radial projections.

21. The self-attaching fastener as defined in claim 17, wherein said outer circumference of said radial flange portion includes planar surfaces between said circumferentially spaced radial projections.

22. A self-attaching fastener, comprising:
   a tubular barrel portion having a first end and a second open free end;
   a radial flange portion integral with said tubular barrel portion adjacent said first end having an outer circumference including a plurality of circumferentially spaced radial projections; and
   each of said circumferentially spaced radial projections including opposed planar generally radial side faces extending generally perpendicular to said circumference of said radial flange portion, said radial projections circumferentially spaced on said outer circumference of said radial flange portion a circumferential width greater than a circumferential width of said radial projections measured between said planar generally radial side faces and each of said radial projections having a cylindrical end face, wherein said cylindrical end faces are circumferentially aligned to define a discontinuous cylindrical outer surface of said radial flange portion.

23. The self-attaching fastener as defined in claim 22, wherein said circumferential width of said radial projections is greater than a radial length of said radial projections.

24. A method of attaching a fastening element in a panel, said fastening element including a tubular barrel portion having an open free end and a radial flange portion opposite said open free end of said tubular barrel portion having a plurality of circumferentially spaced radial projections, each radial projection having a planar generally radial side face and wherein said radial projections have a circumferential width less than a circumferential width of said radial flange portion between said circumferentially spaced radial projections forming outwardly opening radial recesses having a circumferential width greater than said circumferential width of said radial projections, said method comprising:
   supporting a panel on a panel support surface of a die member including an annular die cavity having a frustoconical outer surface and a central die post;
   aligning said tubular barrel portion with said central die post of said die member and driving said open free cad of said tubular barrel portion through an opening in said panel;
   deforming a first portion of said panel circumscribing said tubular barrel portion into said annular die cavity against said central die post;
   deforming said open free end of said tubular barrel portion in said annular die cavity around said first portion of said panel circumscribing said tubular barrel portion; and
   deforming a second panel portion adjacent said first panel portion incrementally radially inwardly against an outer surface of said radial projections and into said outwardly opening radial recesses of said radial flange portion thereby preventing said fastening element from rotating about a longitudinal axis relative to said panel.

25. The method of attaching a fastening element in a panel as defined in claim 24, wherein said die member includes an arcuate surface between said panel support surface and said frustoconical outer face and said method including deforming said first panel portion around said arcuate surface into said die cavity with said first panel portion engaging an outer surface of said tubular barrel portion and said second panel portion spaced from said frustoconical outer surface of said annular die cavity, then deforming said second panel portion incrementally radially inwardly against a portion of said frustoconical outer surface adjacent said arcuate surface.

26. The method of attaching a fastening element in a panel as defined in claim 24, wherein said method includes piercing said opening in said panel by driving said open free end of said tubular barrel portion against an outer surface of said central die post of said die member.

27. The method of attaching a fastening element in a panel as defined in claim 24, wherein said method includes deforming said open free end of said tubular barrel portion radially outwardly and upwardly around said first portion of said panel forming a generally U-shaped end portion of said tubular barrel portion receiving said first panel portion adjacent said opening in said U-shaped end portion of said tubular barrel portion.

28. A self attaching fastener, comprising:
a tubular barrel portion having a first end and a second open free end;
a radial flange portion integral with said barrel portion adjacent said first end of said tubular barrel portion having an outer circumference including a plurality of circumferentially spaced radial projections; and
each of said spaced radial projections including opposed planar generally radial side faces extending generally perpendicular to said outer circumference of said radial flange portion and convex end faces.

29. A self-attaching male fastener, comprising:
a tubular barrel portion having a first end and a second open free end
a radial flange portion integral with said barrel portion adjacent said first end of said tubular barrel portion having an outer circumference including a plurality of circumferentially spaced radial projections, each of said radial projections including a planar, generally radial side face extending generally perpendicular to said outer circumference of said radial flange portion and a plurality of circumferentially spaced generally planar surfaces located between said radial projections; and
a threaded shank portion integral with said first end of said tubular barrel portion coaxially aligned with said tubular barrel portion.

30. A self-attaching fastener, comprising:
a tubular barrel portion having a first end and a second open free end; and
a radial flange portion integral with said barrel portion adjacent said first end of said radial flange portion having a discontinuous outer circumferential surface including a plurality of circumferentially spaced radial projections, each of said radial projections having a planar generally radial side face extending generally perpendicular to a circumference of said radial flange portion, and a plurality of planar surfaces between said radial projections, wherein said planar surfaces each have a circumferential width greater than a circumferential width of said radial projections.

31. The self-attaching fastener as defined in claim 30, wherein each of said radial projections has a convex end face.

32. The self-attaching fastener as defined in claim 30, wherein said self-attaching fastener is a male fastener having a shank portion integral with said first end of said tubular barrel portion coaxially aligned with said tubular barrel portion.

* * * * *

UNITED STATES PATENT AND TRADEMARK OFFICE
CERTIFICATE OF CORRECTION

PATENT NO. : 7,179,034 B2  
APPLICATION NO. : 10/271480  
DATED : February 20, 2007  
INVENTOR(S) : Harold A. Ladouceur Page 1 of 1

It is certified that error appears in the above-identified patent and that said Letters Patent is hereby corrected as shown below:

Title Page;
    Please correct the patent term adjustment under "Notice" on the title page from "403" days to --190-- days.

Column 10, line 50, please delete "cad" and insert --end--.

Column 11, line 23, please insert a hyphen between the words "self attaching.".

Signed and Sealed this

Eighteenth Day of March, 2008

JON W. DUDAS  
*Director of the United States Patent and Trademark Office*